US006573319B1

(12) United States Patent
Birnbrich et al.

(10) Patent No.: US 6,573,319 B1
(45) Date of Patent: Jun. 3, 2003

(54) METHODS OF PREPARING POLYOLEFIN-BASED MATERIALS HAVING IMPROVED ADHESIVE/COATING COMPATIBILITY

(75) Inventors: Paul Birnbrich, Solingen (DE); Joerg-Dieter Klamann, Bremerhaven (DE); Rolf Tenhaef, Duesseldorf (DE)

(73) Assignee: Cognis Deütschland GmbH, Duesseldorf (DE)

( * ) Notice: Subject to any disclaimer, the term of this patent is extended or adjusted under 35 U.S.C. 154(b) by 0 days.

(21) Appl. No.: 09/831,512

(22) PCT Filed: Oct. 30, 1999

(86) PCT No.: PCT/EP99/08279

§ 371 (c)(1),
(2), (4) Date: Aug. 15, 2001

(87) PCT Pub. No.: WO00/27912

PCT Pub. Date: May 18, 2000

(30) Foreign Application Priority Data

Nov. 10, 1998 (DE) .......................... 198 51 691

(51) Int. Cl.[7] ................................. C08L 5/20
(52) U.S. Cl. ..................... 524/224; 524/221; 524/223; 524/227; 524/228; 524/398; 524/399; 524/372.2; 524/403
(58) Field of Search ................. 524/221, 223, 524/224, 227, 228, 398, 399, 403; 427/372.2

(56) References Cited

U.S. PATENT DOCUMENTS

| 4,035,325 A | * | 7/1977 | Poppe et al. | 260/23 H |
|---|---|---|---|---|
| 4,684,683 A | * | 8/1987 | Ficker et al. | 524/220 |
| 4,826,898 A | * | 5/1989 | Hirowasa et al. | 524/88 |
| 5,098,939 A | * | 3/1992 | Sienkowski et al. | 524/224 |
| 5,286,525 A | * | 2/1994 | Chen et al. | 427/256 |
| 5,449,711 A | * | 9/1995 | Saito et al. | 524/224 |
| 5,543,451 A | * | 8/1996 | Chen et al. | 524/224 |
| 5,602,208 A | * | 2/1997 | Klamann et al. | 525/374 |
| 5,756,567 A | * | 5/1998 | Rohrmann | 524/232 |
| 6,107,406 A |  | 8/2000 | Birnbrich et al. | 525/227 |
| 6,312,631 B1 | * | 11/2001 | Bialas et al. | 264/78 |
| 6,326,427 B1 | * | 12/2001 | Birnbrich et al. | 524/398 |

FOREIGN PATENT DOCUMENTS

| DE | 197 12 379 A1 | * | 10/1998 | .......... C08L/23/02 |
|---|---|---|---|---|
| DE | 199 40 692 A1 | * | 3/2001 | ............. C08J/3/22 |
| EP | 0 372 890 B1 |  | 6/1990 | |
| EP | 0 616 622 B1 |  | 9/1994 | |
| JP | 64-6176 A | * | 1/1989 | .......... D06M/13/40 |
| WO | WO 97/12694 |  | 4/1997 | |
| WO | WO 98/42776 A1 | * | 10/1998 | ............ C08K/5/00 |
| WO | WO 98/42776 |  | 10/1998 | |
| WO | WO 00/27912 A1 | * | 5/2000 | ........... C08K/5/098 |

OTHER PUBLICATIONS

Stoeckert, "Veredeln von Kunststoff–Oberflächen," Carl Hanser Verlag, Munich, 1974, pp. 136–137.
Neumüller, "Römpps Chemie–Lexikon", Stuttgart, 1977, pp. 3717–3719.

* cited by examiner

*Primary Examiner*—David W. Wu
*Assistant Examiner*—Rip Lee
(74) *Attorney, Agent, or Firm*—John E. Drach; Aaron R. Ettelman

(57) ABSTRACT

Methods of preparing polyolefin-based molded materials with improved adhesive/coating compatibility by incorporating aromatic carboxylic acid amides and transition metal compounds in the polyolefin-based material prior to molding are described. Methods of producing coated or bonded polyolefin-based, molded materials are also described.

18 Claims, No Drawings

METHODS OF PREPARING POLYOLEFIN-BASED MATERIALS HAVING IMPROVED ADHESIVE/COATING COMPATIBILITY

BACKGROUND OF THE INVENTION

Molded workpieces of any three-dimensional form, including polyolefin-based moldings, fibers and films, are used on a very wide scale in practice. An important problem area here is improving the surface properties of these structurally nonpolar hydrocarbon components. Thus, the poor adhesion of coatings and adhesives is a central problem which has remained unsolved for decades despite numerous attempts to find a solution.

It is known that the compatibility of plastic surfaces with coatings and adhesives can be improved, for example, by oxidative aftertreatment processes, such as corona or plasma treatment. In processes such as these, the surface of the plastic is oxidized or chemically modified in the presence of gases and discharges, so that certain surface properties of the plastic can be modified. However, apart from their high energy consumption, processes such as these always involve an additional step and lead to ozone emissions in the manufacture of plastic parts. In addition, chemical pretreatment processes, including for example treatment with fluorine or chlorine gas, with chromosulfuric acid or fluorosulfonic acid, etc., have also been known for some time.

EP-B-372 890 describes polyolefin- or polyester-based fibers with a lubricant adhesively applied to their surface. This lubricant comprises a mixture of (1) fatty acid diethanolamide, (2) a polyether-modified silicone, (3) a sorbitan fatty acid ester and (4) a metal salt of an alkyl sulfonate. Components (1) to (4) are present in special quantity ratios. According to page 3, lines 20 to 26, the mixture of components (1) to (4) is applied to the surface. The technique by which the mixture containing the four components is applied to the surface of fibers is described in detail on page 4, lines 6 to 9. The application techniques mentioned include a) the use of rollers, b) spraying and c) immersion. Accordingly, the process according to EP-B-372 890 is a process in which a mixture of components (1) to (4) is applied to the surface of polyolefin moldings in an additional process step. Accordingly, the expression "adhesively applied to the fiber surface" used in claim 1 of EP-B-372 890 may be clearly interpreted by the expert to mean that any adhesion involved is loose and temporary, for example in the form of relatively weak adhesion forces, and cannot in any way to be considered to represent permanent anchorage.

In view of the very widely used traditional chemical aftertreatment processes, such as corona and plasma treatment, it is known to the expert that no exact statements can be made as to the various processes involved. However, it has been established that oxidative surface changes occur and result in the formation of certain "active centers". Unfortunately, their concentration generally decreases with time so that the pretreatment effect also is only in evidence for a certain time, generally not more than 72 hours (cf. for example, Klaus Stoeckert (Editor), "Veredeln von Kunststoff-Oberflächen", Munich 1974, page 137).

One feature common to all the known processes is that, in general, the desired surface effects are only temporarily present.

EP-B-616 622 relates to extrudable compostable polymer compositions comprising an extrudable thermoplastic polymer, copolymer or mixtures thereof containing a degradation-promoting system of an auto-oxidative component and a transition metal. The auto-oxidative system comprises a fatty acid, a substituted fatty acid or derivatives or mixtures thereof, the fatty acid having 10 to 22 carbon atoms and containing at least 0.1% by weight of unsaturated compounds and at least 0.1% by weight of free acid. The transition metal is present in the composition in the form of a salt in a quantity of 5 to 500 ppm and is selected from the group consisting of cobalt, manganese, copper, cerium, vanadium and iron. In the form of a film around 100 microns thick, the composition is said to be oxidatively degradable to a brittle material over a period of 14 days at 60° C. and at a relative air humidity of at least 80%.

WO 97/12694 and WO 98/42776 describe the use of amphiphiles for permanently improving the adhesive and/or coating compatibility of polyolefin-based moldings, fibers and films in which a mixture containing (a) predominantly one or more polyolefins, (b) one or more migratable amphiphiles and (c) of one or more transition metal compounds is subjected in the usual way to molding, for example by extrusion, at temperatures in the range from 180 to 320° C. It is disclosed that dialkanolamides of unsaturated fatty acids, for example oleic acid diethanolamide or linoleic acid diethanolamide, are particularly suitable for use as component (b). So far as the nature of component (c) is concerned, WO 97/12694 makes particular mention of Co, Zr, Fe, Pb, Mn, Ni, Cr, V and Ce while WO 98/42776 refers in particular to Ti and Sn as the transition metal present in that component.

BRIEF SUMMARY OF THE INVENTION

The present invention relates, in general, to the use of amides of aromatic carboxylic acids for permanently improving the adhesive and/or coating compatibility of polyolefin-based moldings, fibers and films.

The problem addressed by the present invention was to provide auxiliaries with which the adhesive and/or coating compatibility of polyolefin-based moldings, fibers and films could be lastingly and permanently improved. In other words, the object of the invention was to provide auxiliaries for permanently improving the affinity of polyolefin surfaces for adhesives and/or coatings. More particularly, the object of invention was to make it possible to establish high-strength bonds which would rule out unwanted adhesive failures and would ensure that the adhesive joint could only be destroyed by cohesive failure or by combined cohesive/adhesive failure. In particular, the effectiveness of the amphiphiles known from the prior art in permanently improving the adhesive and/or coating compatibility of polyolefin-based moldings, fibers and films would be quantitatively improved.

The present invention relates to the use of carboxylic acid amides for permanently improving the adhesive and/or coating compatibility of polyolefin-based moldings, fibers and films, a mixture containing a) predominantly one or more polyolefins,
b) 0.01 to 20% by weight—based on the polyolefins—of one or more carboxylic acid amides and
c) 0.01 to 1000 ppm of one or more transition metal compounds—metal content of the transition metal compounds, based on the polyolefins—being subjected in known manner to molding by extrusion, calendering, injection molding, blow molding and the like at temperatures of 180 to 330° C., with the proviso that the carboxylic acid amides b) are selected from the class of amides of aromatic carboxylic acids "Transition metals" in the context of the present invention are any transition metals in the narrower sense (cf. for example Römpps Chemie-Lexikon, Stuttgart 1977, pp. 3717) and, in addition, the metals tin (Sn) and lead (Pb).

The amides of aromatic carboxylic acids b) to be used in accordance with the invention are derived from aromatic carboxylic acids. These are compounds which have an aromatic skeleton that may optionally be substituted by one or more alkyl groups, one or more carboxyl functions being present on this skeleton and/or at the alkyl substituents.

In principle, the aromatic skeleton of the carboxylic acids on which the compounds b) are based is not subject to any limitations. Thus, the aromatic structural unit of the compounds b) may be derived from benzene although it may equally well be derived from a polycyclic compound such as, for examle, naphthalene, anthracene, etc.

Examles of particularly suitable aromatic carboxylic acids on which the compounds b) are based are benzoic acid, phthalic acid, terephthalic acid.

DETAILED DESCRIPTION OF THE INVENTION

In one embodiment, the compounds b) are characterized by general formula (I):

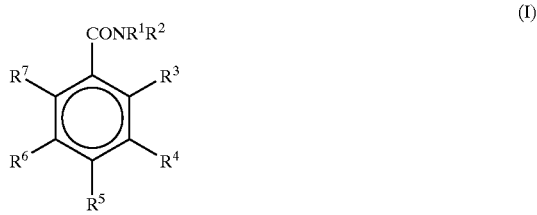

(I)

in which
$R^1$ is a —$(CH_2)_n$—OH group where n is a number of 1 to 6,
$R^2$ is hydrogen, a $C_{1-3}$ alkyl group or a —$(CH_2)_n$—OH group where n is a number of 1 to 6,
$R^3$ to $R^7$ independently of one another represent hydrogen, a $C_{1-12}$ alkyl group or a —$CONR^1R^2$ group where $R^1$ and $R^2$ are as defined above.

In one embodiment, the total number of —$CONR^1R^2$ groups in compounds of formula (I) is at most three. In another embodiment, the total number of —$CONR^1R^2$ groups in compounds of formula (I) is at most two.

The compounds (I) may be used both individually and in combination with one another. The compounds mentioned are used in particular in technical quality.

The compounds b) to be used in accordance with the invention are capable of migration. This means that these compounds are capable of moving during production, for example by extrusion, to the surface of the resulting polyolefin molding. Accordingly, they accumulate at the surface of the plastic matrix or in zones near its surface which Applicants were able to verify by successive removal of surface layers of the order of a few nanometers in thickness and subsequent application of Abscan techniques.

The use of the special carboxylic acid amides b) mentioned in accordance with the invention ensures that coatings and adhesives are able to adhere to the plastic permanently and without additional pretreatment. Once established, adhesive and/or coating compatibility values remain intact for long periods or sometimes even increase in the event of continued storage. According to the invention, there are basically no restrictions as to the type of adhesives and coating compositions which can be brought into contact with the polyolefins surface-modified in accordance with the invention so that permanent bonding or coating is achieved. Thus, any adhesives known to the expert, especially commercially available adhesives, may be used as the adhesives. So far as coatings are concerned, paints are particularly relevant. Paints are liquids or powder-form solids which are applied in thin layers to surfaces and which form a strong decorative and/or protective film on those surfaces by chemical reaction and/or physical processes. Coatings in the context of the invention also include printing inks because printing inks are applied to substrates to be printed in a binder layer, adhesion to the substrate being imparted by the binder which forms a coating.

The mixture containing components a), b) and c) is used in traditional molding techniques well-known to the expert, such as extrusion, calendering, injection molding and the like. In a preferred embodiment of the present invention, the melt of the mixture containing components a), b) and c) comes into contact with oxygen, more especially atmospheric oxygen, in the course of the molding process. In the case of extrusion, for example, this happens when the melt leaves the extruder through the extrusion die. The preferred embodiment mentioned above enables oxidative—optionally catalytically assisted—processes and other secondary reactions to take place. (Atmospheric) oxygen can act on the one hand on the surface itself and, on the other hand, even in the interior of the plastic—especially in zones near the surface—to which it is capable of diffusing.

The combination of the teaching according to the invention which leads to high adhesive or coating compatibility values with technologies known per se for improving coating or adhesive compatibility on polyolefin surfaces falls within the scope of the teaching according to the invention. Thus, the surfaces of the polyolefins produced in accordance with the invention may also be both mechanically and chemically and/or physically treated. However, this is generally not necessary.

As already mentioned, the compounds b) are used in combination with transition metal compounds c) during the molding of the polyolefins a). The quantity of transition metal compound—metal content of the transition metal compound based on the polyolefins—is in the range from 0.01 to 1000 ppm. Basically, there are no particular restrictions as to the nature of the transition metal compounds. In principle, therefore, any transition metal compounds known to the expert may be used for the purposes of the teaching according to the invention. In one embodiment, transition metal salts, preferably salts based on organic acids containing 6 to 22 carbon atoms, are used as the transition metal compounds. In another embodiment, the transition metal compounds are used in a quantity below 5 ppm—metal content of the transition metal compound based on the polyolefins. Another embodiment is characterized by the use of transition metal compounds c) of which the metals are selected from the group consisting of Co, Zr, Fe, Pb, Mn, Ni, Cr, V, Ce, Ti and Sn.

If desired, other compounds known to the expert as catalysts for oxidative processes may be used in addition to the compulsory transition metal compounds mentioned.

In one preferred embodiment, the ratio by weight of the compounds b) to the metal content of the transition metal compounds c) is adjusted to a value of 10:0.1 to $10:10^{-7}$, preferably to a value of 10:0.02 to $10:10^{-6}$ and more preferably to a value of 10:0.01 to $10:10^{-5}$.

According to the invention, the special carboxylic acid amides b) are used in the course of routine molding processes, such as extrusion, calendering, injection molding and the like. It may be desirable to use components a), b) and c) in the form of a mixture prepared in advance. Other typical auxiliaries which have generally been successful in the molding of plastics and which are known to the expert, for example slip agents, antistatic agents, lubricants, release agents, UV stabilizers, antioxidants, fillers, fire retardants, mold release agents, nucleating agents and antiblocking agents, may also be separately made up and added during the final mixing of the end products. The common practice of using the auxiliaries mentioned in a form in which they are already completely or partly present in component a) is also expressly included within the scope of the present invention.

However, it may also be desirable, for example where extrusion is applied, to introduce components b) and/or c) and/or other additives either completely or partly into the polyolefin melt itself in the extruder, so that the mixture of components a), b) and c)—and optionally other auxiliaries—is not present from the outset as a made-up product, but is formed in the extruder itself. A technique such as this is appropriate, for example, when the compounds b) to be added to the polymer melt are present in liquid form and are easier to inject than to make up in advance.

It may even be desirable, although not necessary for obtaining the effect according to the invention, to undertake a conventional corona or plasma treatment after the use of components a) to c) in accordance with the invention.

Basically, any known ethylene- or propylene-based polymers and copolymers may be used as the basic oleophilic polyolefin material.

Mixtures of pure polyolefins with copolymers are also suitable in principle providing the compounds b) retain their ability to migrate in accordance with the invention and hence to collect at the surfaces of solids. Polymers particularly suitable for the purposes of the teaching according to the invention are listed below: poly(ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); isotactic polypropylene; syndiotactic polypropylene; Metallocen-catalyzed polypropylene, high-impact polypropylene, random copolymers based on ethylene and propylene, block copolymers based on ethylene and propylene; EPM (poly[ethylene-co-propylene]); EPDM (poly[ethylene-co-propylene-co-unconjugated diene]).

Other suitable polymers are: poly(styrene); poly(methylstyrene); poly(oxymethylene); Metallocen-catalyzed α-olefin or cycloolefin copolymers, such as norbornene/ethylene copolymers; copolymers containing at least 80% ethylene and/or styrene and less than 20% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly(ethylene-co-vinyl chloride), poly(styrene-co-acrylonitrile). Also suitable are graft copolymers and polymer blends, i.e. mixtures of polymers in which the above-mentioned polymers inter alia are present, for example polymer blends based on polyethylene and polypropylene.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

The application of coatings or adhesives to the surface-modified polyolefin-based moldings and films obtained by the process according to the invention may basically be carried out by any of the relevant methods known to the expert.

In one embodiment, polyethylene is used as component a). If it is HDPE (high-density polyethylene), a temperature of 200 to 300° C. is preferably adjusted during molding whereas, in the case of HDPE containing carbon black, the molding temperature is preferably adjusted to a value in the range from 250 to 300° C. If LDPE (low-density polyethylene) is used, a temperature of 180 to 260° C. and more particularly in the range from 200 to 260° C. is preferably adjusted during the molding process.

In the case of extrusion processes, the temperatures just mentioned for HDPE and LDPE apply in particular to the temperature of the die.

If the mixture of components a), b) and c) is molded by extrusion, the polyolefin molding is cooled by at most 50° C., preferably in 0.1 to 5.0 seconds, immediately after leaving the die. Accordingly, this temperature difference of 50° C.—hereinafter also referred to as ΔT50—is governed by the following equation:

$$\Delta T50 = T_{die} - T_{polyolefin\ surface}$$

where $T_{die}$ is the temperature of the extrusion die while $T_{polyolefin\ surface}$ is the surface temperature of the extruded polyolefin molding as measured without any contact, for example using relevant known infrared techniques (for example with a Chino "IR-TA/Handy 1000" infrared thermometer).

In one particularly preferred embodiment, the polyolefin molding is cooled by at most 50° C. in 1.0 to 5.0 seconds and more particularly in 1.7 to 5.0 seconds immediately after leaving the extrusion die.

Assuming that the polyolefin molding moves at a constant speed after leaving the extrusion die, the time scale mentioned can easily be converted into a distance scale using the known equation v=s/t (speed=distance divided by time) which can be transformed to s=v * t (distance=speed multiplied by time) from which it can be seen that distance s (i.e. distance from the extrusion die) and time t are proportional to one another. By definition, the zero point of the distance scale is situated immediately at the exit point of the die.

The polyolefin moldings obtainable using the carboxylic acid amides b), more particularly the granules obtainable by extrusion, may be used as so-called master batches in the processing of bulk plastics.

The present invention also relates to a process for the production of bonded and/or coated polyolefin-based moldings, fibers and films, in which a mixture containing
  a) predominantly one or more polyolefins,
  b) 0.01 to 20% by weight—based on the polyolefins—of one or more carboxylic acid amides and
  c) 0.01 to 1000 ppm of one or more transition metal compounds—metal content of the transition metal compounds, based on the polyolefins—is subjected in known manner to molding by extrusion, calendering, injection molding, blow molding and the like at temperatures of 180 to 330° C. and the resulting polyolefin-based moldings, fibers and films with improved adhesive and/or coating compatibility are subsequently contacted in the usual way with an adhesive and/or a coating composition, characterized in that the carboxylic acid amides b) are selected from the class of amides of aromatic carboxylic acids.

EXAMPLES

1. Materials Used 1.1. Polyolefins (a)

Lupo: low-density polyethylene ("Lupolen 1800 H", a product of Elenac)

1.2. Additives (b)

TDA: terephthalic acid diethanolamide

BDA: benzoic acid diethanolamide 1.3. Transition Metal Compounds (c)

A mixture of cobalt(II) octoate and zirconium(II) octoate was used. To this end, a mixture of 4.3 g of a solution of cobalt(II) octoate in toluene (with a cobalt content of 6% by weight), 10.3 g of a solution of zirconium(II) octoate in toluene (with a zirconium content of 6% by weight) and 10.3 g toluene was prepared. This mixture was used in a quantity of 0.3 g per 600 g component a).

2. Production of Surface-modified Polyethylene by the Process According to the Invention In order to test the adhesive compatibility properties of surface-modified polyethylene, polyethylene was initially produced in tape form by mixing 600 g of polyethylene granules a) (the particular type of polyethylene used is shown in Tables 1 to 3), additive b) and transition metal compound c).

The particular type and quantity of components b) and c) used are shown in Table 1. The mixtures were introduced through a hopper into an extruder. A Brabender DSK 42/7 twin-screw extruder (Brabender OHG, Duisburg) was used. As well-known to the expert, an extruder is a machine for processing plastics in which both powder-form and granular thermoplastics can be continuously mixed and plasticized. Beneath the feed hopper, there is a contra-rotating twin screw longitudinally divided into three heating zones in addition to a water-cooling system which is intended to prevent premature melting of the granules or powder. The temperature of the heating zones and the rotational speed of the twin screw can be controlled through a data-processing Plast-Corder PL 2000 which is connected to the extruded via a PC interface. To produce the polyethylene tapes, the following temperatures were adjusted: heating zones I–III all 230° C., the three heating zones being air-cooled to keep the temperatures constant.

The polyethylene granules (including the particular components b) and c) were automatically taken into the extruder by the contra-rotating twin screw and transported along the screw. The rotational speed was 50 r.p.m. This guaranteed a relatively long residence time in the extruder and hence thorough compounding and homogenization. The resulting homogeneous and substantially bubble-free mixture finally entered a die which represents a fourth heating zone. The temperature of the die was varied in the individual tests and is shown in Table 1.

After leaving the die, the hot mixture flowed onto a conveyor belt of which the speed was adjusted so that a smooth and uniformly thick and wide tape was formed on cooling in air. In the tests described here, the speed was adjusted so that the polyethylene tape was about 35 mm wide and about 0.35 mm thick. Square test specimens (25×25 mm) were die-cut from this material and used for the bonding tests described hereinafter.

3. Adhesion and Tensile Tests 3.1. Production of the Test Specimens

The extruded tapes produced in accordance with 2) were stored for 24 hours at room temperature (20° C.). Square 25×25 mm pieces of polyethylene were then bonded between two 100×25 mm strips of wood. The bond had a thickness of 2 mm. The area bonded measured exactly 25×25=625 mm². It is pointed out that the test arrangement corresponds to that schematized on page 21 of the above-cited WO 98/42776 (except that the pieces of polypropylene was replaced by pieces of polyethylene).

A two-component adhesive ("Makroplast" polyurethane adhesive, a product of Henkel KGaA, Düsseldorf) was used as the adhesive. The two reactive components (resin=UK 8109; hardener=UK 5400) were stirred in a ratio of 5:1 in an aluminium dish. The pot life was about 1 hour.

After storage for about 1 hour, 25 mm wide strips were cut off from each tape and, with the aid of a template, were bonded on both sides between two strips of wood. Five strips of each plastic tape were bonded. The use of a template ensures that the required surface to be bonded is kept to between the modified plastic and the strips of wood. Wooden clamps were used to fix the test specimen. Surplus adhesive was removed.

3.2. Tensile Tests

The test specimens produced in accordance with 3.1.) were stored for about 3 to 4 days at 20° C. to ensure that the two-component adhesive was fully cured. A Zwick universal testing machine was used to measure the tensile shear forces. The rate at which the test specimen was placed under tensile load was 15 mm/min. The bonded wood spatulas (=test specimens) were clamped in the clamping jaws of the universal testing machine and pulled apart at the designated test rate. Care was taken to ensure that the test specimens were always arranged vertically and exactly in the middle of the testing machine. The test results obtained are set out in Table 1. All the results are averages of 5 tests.

Explanation of column headings of Table 1:

No. test number (B=invention; C=comparison)

a) component a) (polyolefin)

b) component b); the "%" column shows the quantity in which the particular compound—% by weight, based on component a)—was used c) component c); the "ppm Me" column shows the quantity in ppm (parts per million) in which the transition metal of the transition metal compound—based on component a)—was used T/die: die temperature in ° C.

TSS: tensile shear strength as determined in the tensile tests and expressed in newtons/mm²

TABLE 1

| a) | b) % | b) Compound | c) ppm Me | c) Compound | T/die ° C. | TSS |
|---|---|---|---|---|---|---|
| Lupo | — | — | 17.6 | Co/Zr octoate | 250 | 0.20 |
| Lupo | 1.0 | TDA | 17.6 | Co/Zr octoate | 250 | 0.49 |
| Lupo | 0.5 | BDA | 17.6 | Co/Zr octoate | 250 | 0.99 |
| Lupo | 1.0 | BDA | 17.6 | Co/Zr octoate | 250 | 1.79 |

It can be seen from Table 1 that the results obtained where the amides of aromatic carboxylic acids according to the invention (cf. Examples B1 to B3) are used are distinctly better than those obtained in the absence of additives.

What is claimed is:

1. A method of preparing molded polyolefin-based materials with improved adhesive/coating compatibility, said method comprising:

(a) providing a polyolefin-based material to be molded, said material comprising one or more polyolefins, from 0.01 to 20% by weight of an aromatic carboxylic acid amide, based upon a total weight of the one or more polyolefins, and a metal compound, wherein the metal is selected from the group consisting of transition metals, lead, and tin, in an amount of from 0.01 to 1000 ppm metal based on the one or more polyolefins; and (b) subjecting the polyolefin-based material to a molding procedure.

2. The method according to claim 1, wherein the one or more polyolefins is selected from the group consisting of polyethylenes, polypropylenes, and polyethylene/polypropylene copolymers.

3. The method according to claim 1, wherein the one or more polyolefins comprises a polyethylene.

4. The method according to claim 1, wherein the aromatic carboxylic acid amide corresponds to general formula (I):

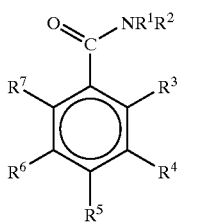

(I)

wherein $R^1$ represents a —$(CH_2)_n$—OH group where n is a number of from 1 to 6, $R^2$ represents hydrogen, a $C_{1-3}$ alkyl group or a —$(CH_2)_n$—OH group where n is a number of from 1 to 6, and each of $R^3$, $R^4$, $R^5$, $R^6$ and $R^7$ independently represents hydrogen, a $C_{1-12}$ alkyl group or a —$C(O)NR^1R^2$ group where $R^1$ and $R^2$ are as defined above.

5. The method according to claim 4, wherein up to two of $R^3$, $R^4$, $R^5$, $R^6$ and $R^7$ represent a —$C(O)NR^1R^2$ group.

6. The method according to claim 4, wherein up to one of $R^3$, $R^4$, $R^5$, $R^6$ and $R^7$ represents a —$C(O)NR^1R^2$ group.

7. The method according to claim 4, wherein the aromatic carboxylic acid amide is based on an acid selected from the group consisting of benzoic acid, phthalic acid, terephthalic acid, and mixtures thereof.

8. The method according to claim 4, wherein $R^2$ represents a —$(CH_2)_n$—OH group wherein n is a number of from 1 to 6.

9. The method according to claim 1, wherein the aromatic carboxylic acid amide is selected from the group consisting of terephthalic acid diethanolamide and benzoic acid diethanolamide.

10. The method according to claim 1, wherein the combined polyolefin-based material, aromatic carboxylic acid amide and metal compound is molded by extrusion, wherein cooling is carried out at a temperature rate of up to 50° C. in from 0.1 to 5.0 seconds.

11. The method according to claim 1, wherein the metal compound comprises a metal selected from the group consisting of Co, Zr, Fe, Pb, Mn, Ni, Cr, V, Ce, Ti and Sn.

12. The method according to claim 1, wherein the metal compound comprises a transition metal salt.

13. The method according to claim 1, wherein the metal compound is present in an amount of less than 5 ppm metal based on the one or more polyolefins.

14. The method according to claim 1, wherein the ratio by weight of the aromatic carboxylic acid amide to the metal compound metal content is adjusted to a value of from 10:0.1 to 10:10⁻⁷.

15. The method according to claim 1, further comprising subjecting the molded, combined polyolefin-based material, aromatic carboxylic acid amide and metal compound to a corona or plasma treatment.

16. A process for producing bonded and/or coated polyolefin-based moldings, fibers and films, said process comprising:

(a) providing a molded polyolefin-based material prepared by the method according to claim 1; and (b) contacting a surface of the molded polyolefin-based material with a composition selected from the group consisting of adhesives and coatings.

17. A method of preparing molded polyolefin-based materials with improved adhesive/coating compatibility, said method comprising:

(a) providing a polyolefin-based material to be molded, said material comprising one or more polyolefins;

(b) combining the polyolefin-based material with from 0.01 to 20% by weight of an aromatic carboxylic acid amide, based upon a total weight of the one or more polyolefins, and a metal compound, wherein the metal is selected from the group consisting of transition metals, lead, and tin, in an amount of from 0.01 to 1000 ppm metal based on the one or more polyolefins; and (c) subjecting the combined polyolefin-based material, aromatic carboxylic acid amide and metal compound to a molding procedure;

wherein the aromatic carboxylic acid amide corresponds to general formula (I):

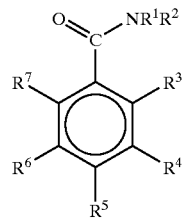

(I)

wherein $R^1$ represents a —$(CH_2)_n$—OH group where n is a number of from 1 to 6, $R^2$ represents hydrogen, a $C_{1-3}$ alkyl group or a —$(CH_2)_n$—OH group where n is a number of from 1 to 6, and each of $R^3$, $R^4$, $R^5$, $R^6$ and $R^7$ independently represents hydrogen, a $C_{1-12}$ alkyl group or a —$C(O)NR^1R^2$ group where $R^1$ and $R^2$ are as defined above.

18. A method of preparing molded polyolefin-based materials with improved adhesive/coating compatibility, said method comprising:

(a) providing a polyolefin-based material to be molded, said material comprising one or more polyethylenes, from 0.01 to 20% by weight of an aromatic carboxylic acid amide, based upon a total weight of the one or more polyethylenes, and a metal salt in an amount of from 0.01 to 5 ppm metal based on the one or more polyolefins, wherein the metal salt comprises a metal selected from the group consisting of Co, Zr, Fe, Pb, Mn, Ni, Cr, V, Ce, Ti and Sn.; and (b) subjecting the polyolefin-based material to a molding procedure;

wherein the aromatic carboxylic acid amide corresponds to general formula (I): wherein $R^1$ represents a —$(CH_2)_n$—OH group where n is a number of from 1 to 6, $R^2$ represents hydrogen, a $C_{1-3}$ alkyl group or a —$(CH_2)_n$—OH group where n is a number of from 1 to 6, and each of $R^3$, $R^4$, $R^5$, $R^6$ and $R^7$ independently represents hydrogen, a $C_{1-12}$ alkyl group or a —$C(O)NR^1R^2$ group where $R^1$ and $R^2$ are as defined above.

* * * * *